March 12, 1957  E. G. ANDERSON  2,784,573
UNIVERSAL JOINTS AND ADJUSTMENTS
Filed June 11, 1954
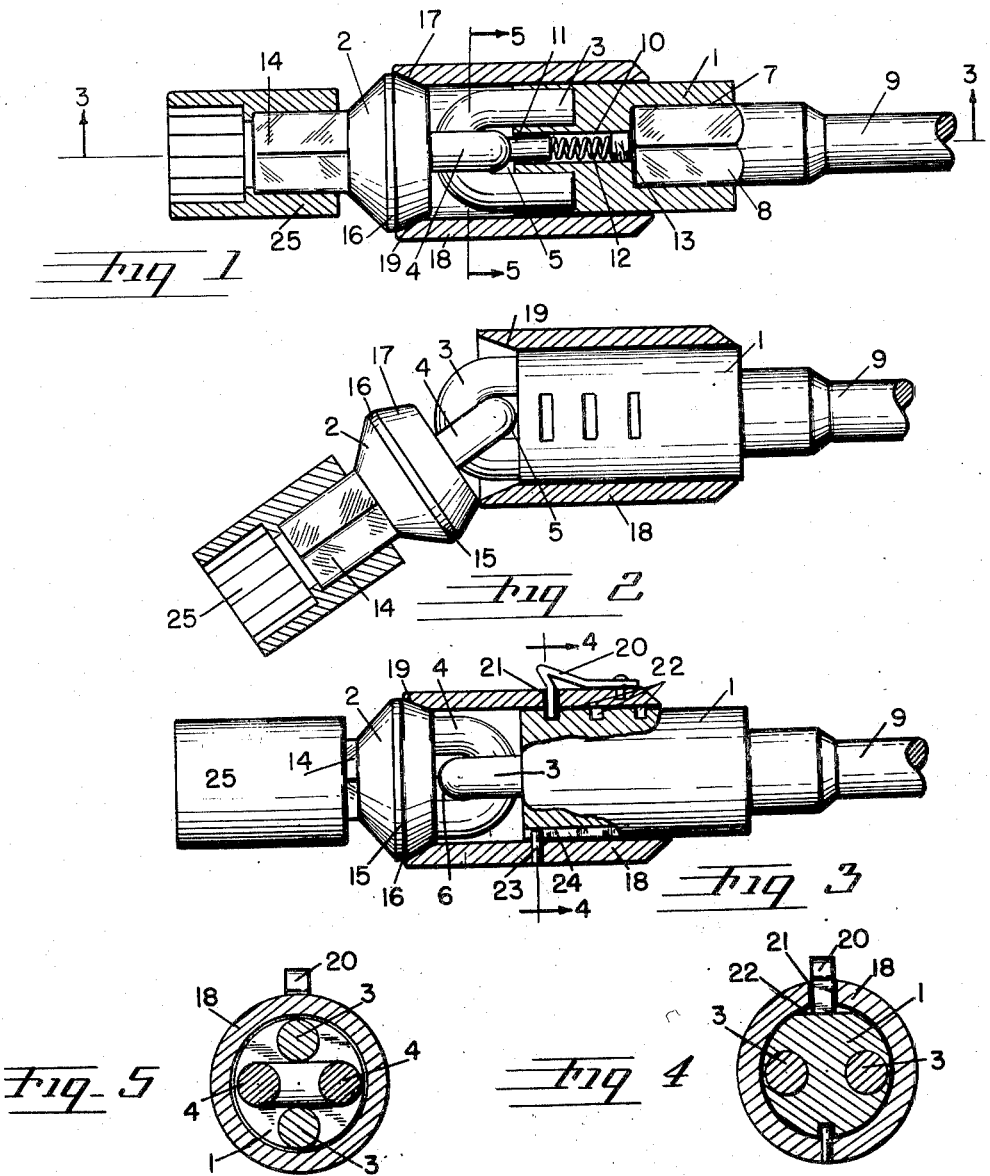
INVENTOR.
Elmer G. Anderson United States Patent Office 2,784,573
Patented Mar. 12, 1957

2,784,573

UNIVERSAL JOINTS AND ADJUSTMENTS

Elmer G. Anderson, Portland, Oreg. assignor of two-thirds to Victor T. Wiglesworth, Portland, Oreg.

Application June 11, 1954, Serial No. 436,099

5 Claims. (Cl. 64—6)

This invention relates to and includes improvements in universal joints; in particular, to universal joints wherein a sleeve is employed in connection with the universal joint to facilitate adjusting the universal joint to ride in a universal movement at a set predetermined degree or angle.

A typical application for this type of universal joint is in hand or machine operated universal joints where pressures must be applied to tighten and/or loosen a bolt or the like that is situated at an angular position from the operator.

A primary object of this invention is to provide a universal joint with means for adjusting and maintaining the angle of rotation of the universal joint, especially where longitudinal pressure is applied.

Another object is to provide means to lock the universal joint to rotate concentric with its horizontal center line: also, to provide means to quickly adjust and lock my universal joint to rotate horizontally and/or at a number of angles to the horizontal.

A still further object is to provide means to hold my universal joint at a preset angle to facilitate placing the socket end of said joint onto a bolt or the like situated in a confined position.

In the drawing:

Figure 1 is a section taken principally along the longitudinal axis of a preferred form of embodiment of the essential features of my invention;

Fig. 2 is a partial section of the same parts shown in Fig. 1 but shown in an angular rotating position;

Fig. 3 is a section view taken on lines 3—3 of Fig. 1, showing my universal joint locked in position to rotate concentric with its horizontal center lines;

Fig. 4 is a section taken on lines 4—4 of Fig. 3, showing the adjusting lock in locked position;

Fig. 5 is a section taken on lines 5—5 of Fig. 1, showing the universal connection of my joint.

Referring to Fig. 1 my invention consists of a driving member 1 and a driven member 2 with U-shaped eyelet members 3 and 4 associated with each and interconnecting one with the other. The U-shaped eyelets 3 and 4 ride within the eyelet portions 5 and 6 respectively on their one end and the open ends of the eyelets 3 and 4 are fastened to the body members 1 and 2, this forming my universal connection.

The driving end of my universal joint consists of the cylindrical member 1 with the eyelet fastened on its one end and a socket recess 7 formed in the opposite end to receive a mating socket end 8 and drive shaft 9, a hole 10 is drilled centrally of the cylinder 1 and a pressure friction plug 11 is inserted within the hole 10 and rides against the outer radius of the eyelet 4, a spring 12, and an adjusting screw 13 adjust the pressures applied to the friction plug 11.

The driven end of my universal joint consists of the cam like member 2 with the eyelet 4 fastened on its one end and a male portion 14 forming the opposite end, the intermediate portion 15 being provided with an enlarged portion 16 and angular cam surface 17. A sleeve 18 slidable upon the cylindrical member 1 provides a mating angular inner cam surface 19 which contacts and rides upon the cam surface 17 of the driven member 2. The sleeve 18 is provided with a spring lock button 20 which extends through a slot 21 in the sleeve and then downward into one of the milled slots 22, retaining the sleeve 18 from any longitudinal movement. A pin 23 forms part of the sleeve and extends into a slotway 24 retaining the sleeve from any circumferential movement.

To adjust my universal drive to one of the drive angles, the spring clip 20 is raised releasing the sleeve 18 to be adjusted by moving the sleeve longitudinally on member 1 toward or away from the cam 2 allowing the cam faces to ride at one of the set angles when the driven end is rotated.

When operating my universal drive an operator may estimate the angle or degree that a bolt head or the like may be situated from a point of access. The sleeve 18 is then adjusted and locked to allow the driven end to rotate at the predetermined angle or near the said angle. The socket head 25 is then placed over the bolt and pressure is applied to the drive end via the drive shaft 9, causing a point contact between the outer end of the sleeve 18 and the cam 17 as illustrated in Fig. 2 of the drawings, allowing the cams to become a rotary stop point around the interlocking links 3 and 4, allowing the said links 3 and 4 to rotate in a universal action smoothly on their inner contact points.

A further feature of my universal adjustment is to allow an operator to lock the universal drive to A in line drive, by moving the sleeve 18 forward, placing the two angular faces 17 and 19 in contact ahead of the fulcrum point of the interlocking links 3 and 4 at an angle forward the fulcrum of approximately 45° as illustrated in Fig. 1. When the driven end is adjusted to rotate at a 45° angle the contact point of the sleeve 18 and the cam 19 is approximately vertical of the fulcrum as illustrated in Fig. 2.

It will be noted that any one of the various types of universal actions may be substituted in place of the universal action shown with some variation in the sleeve and adjustment but not varying the scope of the invention as shown.

What I claim is:

1. A universal drive, comprising a driving end and a driven end, a pair of interlocking U shaped wire links interconnecting the driving and driven ends, an enlarged cam portion formed on the driven end forward the fulcrum of the interlocking links, a sleeve bearinged on the body portion of the driving end positioned to contact the cam on its forward end at points forward the fulcrum of the driving links, a flat spring lock member fastened to the sleeve and contacting slotways in said driving end body portion and a guide pin fastened to said sleeve riding within a keyway in the body portion preventing rotation of the sleeve in reference to the body portion.

2. A universal drive comprising a driving end and a driven end, a universal joint connecting the driving and driven ends, a frusto conical shaped cam portion forming part of the driven end, a tubular sleeve positioned on the lower end of the driving member and extending over and enclosing the universal joint to a point of contact with the cam portion, and manual adjustment means forming part of the tubular sleeve comprising a spring clip having an outward handle portion and a finger portion to be received within spaced slotways of the driving end, said spring clip permitting manual positioning of said tubular sleeve in relation to the driven cam and pre-positioning the axial angle drive between the driving and driven ends.

3. A universal drive comprising a driving end and a driven end, a universal joint connecting the driving and driven ends together, a frusto conically shaped cam portion forming part of the driven end of the universal joint, a tubular sleeve positioned on the driving end of the universal joint to axially contact the frusto conical cam portion of the driven end, a flat spring member forming part of said tubular sleeve with a finger portion positioned to engage slots formed on the driving end body member to position the said tubular sleeve at a set predetermined distance from the cam in relation to the axial angle of the driving and driven end of the universal joint, and spring means to maintain the driving and driven ends of the universal joint at a set position.

4. A universal drive comprising a driving end and a driven end, a universal joint connecting the driving and driven ends together, a cam portion forming part of the driven end of the universal joint, preferential adjustment means including a tubular sleeve positioned on the driving end of the universal joint to axially contact the frusto conical cam portion of the driven end, adjustment means associated with said sleeve to position and lock said sleeve at predetermined distances from the cam portion, said adjustment to include engagement of said sleeve with said cam at positions from 0° to 90° from the universal joint axis.

5. A universal drive comprising a driving end and a driven end, a universal joint connecting the driving and driven ends together, a frusto conical shaped cam portion forming part of the driven end, a tubular sleeve positioned on the lower end of the driving member and extending over and enclosing the universal joint to a point of contact with the cam portion, adjustment means forming part of the tubular sleeve comprising equally spaced slats formed on the driving end body member, a locking member forming part of said sleeve positioned to engage said slats, said adjustment means serving to maintain a symmetrical contact with said conical shaped cam and said tubular sleeve at adjusted positions between 0° and 90° thus providing axial alignment of said driven member with work under thrust exerted by the operator.

References Cited in the file of this patent

UNITED STATES PATENTS

| | | |
|---|---|---|
| 960,061 | Baaden | May 31, 1910 |
| 2,381,102 | Boyd | Aug. 7, 1945 |

FOREIGN PATENTS

| | | |
|---|---|---|
| 840,074 | France | Jan. 11, 1939 |